United States Patent [19]

Kobayashi et al.

[11] Patent Number: 5,014,330
[45] Date of Patent: May 7, 1991

[54] PATTERN POSITION RECOGNIZING APPARATUS

[75] Inventors: Akira Kobayashi, Osaka; Nobutaka Taira, Hirakata; Hideshi Ueda, Yao, all of Japan

[73] Assignee: Matsushita Electric Industrial Co., Ltd., Osaka, Japan

[21] Appl. No.: 446,284

[22] Filed: Dec. 5, 1989

[30] Foreign Application Priority Data

Dec. 9, 1988 [JP] Japan .................................. 63-312239

[51] Int. Cl.$^5$ .............................................. G06K 9/00
[52] U.S. Cl. ......................................... 382/30; 382/8; 382/34
[58] Field of Search ................................. 382/8, 30, 34

[56] References Cited

U.S. PATENT DOCUMENTS 4,707,734 11/1987 Lambinger et al. ..................... 382/8
4,882,763 11/1989 Buchan et al. ........................... 382/1

Primary Examiner—David K. Moore
Assistant Examiner—Daniel Santos
Attorney, Agent, or Firm—Wenderoth, Lind & Ponack

[57] ABSTRACT

A pattern recognition apparatus detects a coincidence between an input image pattern and a target pattern. Input image data $f_{ij}$ are received, where $f_{ij}$ denotes a concentration of the input image pattern at a picture element i,j on a two-dimensional plane of the input image pattern. Mask data $g_{uv}$ is stored, where $g_{uv}$ denotes a concentration of the target pattern at a point u,v on a two-dimensional plane of the target pattern. The mask data $g_{uv}$ is scanned with respect to the input image data $f_{ij}$ and a proportional coefficient is computed corresponding to each picture element i,j of the two two-dimensional plane of the input image pattern. The proportional coefficient denotes a ratio between the concentration of the input image data $f_{ij}$ and the concentration of the mask data $g_{uv}$. The input image data $f_{ij}$ is divided into a plurality of partial templates denoting a two-dimensional subsection of the input image pattern. For each partial template, a proportional evaluation index $\sigma_{ij}$ is calculated corresponding to each picture element i,j of the two-dimensional plane of the input image pattern. The proportional evaluation index $\sigma_{ij}$ denotes a degree of dispersion of the proportional coefficients within each partial template. Be examining the dispersion of the proportional coefficients, a pattern coincidence can be detected.

5 Claims, 5 Drawing Sheets

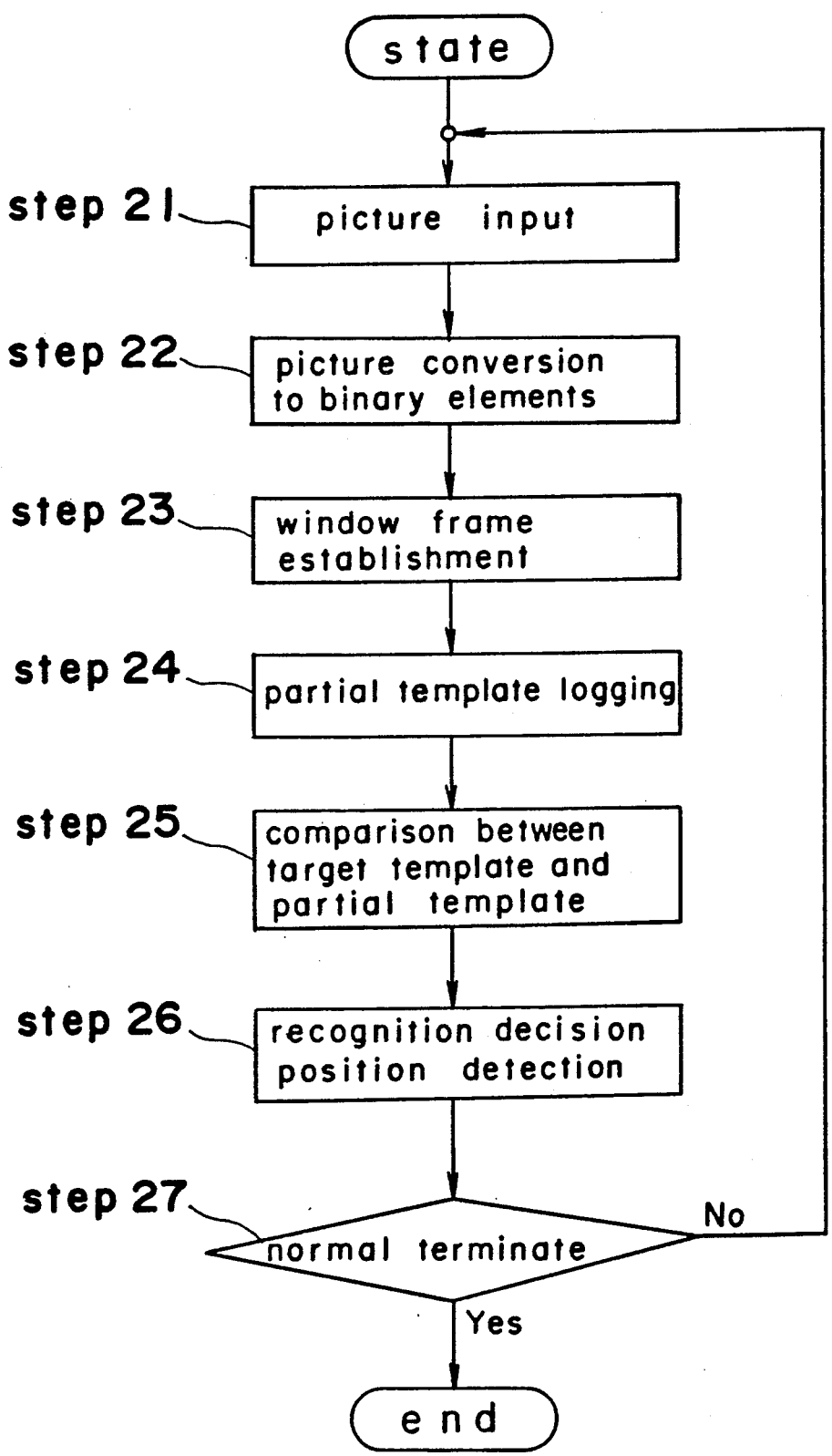

PATTERN POSITION RECOGNIZING APPARATUS

BACKGROUND OF THE INVENTION

The present invention generally relates to a pattern position recognition apparatus which is adapted to effect position recognition of complicated IC chip patterns bonded on a basic plate constituting an electronic circuit.

In recent years, pattern position recognition has been effected using two patterns of images in a non-contact arrangement.

This conventional pattern position recognition technique will be described hereinafter with reference to the drawings.

FIG. 4 is a block diagram of the conventional pattern position recognition apparatus.

Referring to FIG. 4, an illuminating unit 23 is set to illuminate an object 22 which has the patterns to be recognized and which is placed on a positional table 21. A television camera 24 is set on a movable television camera support position 25. The television camera 24 is controlled by a television camera controlling circuit 26.

The image signals output from the television camera 24 enter an analog/digital conversion (hereinafter referred to as A/D conversion) circuit 27, where they are numerically encoded into image data of 0 through 255 gradation levels, and the image data are then inputted into a microcomputer composed of a CPU, a ROM, a RAM, input, output ports and so on.

The pattern position recognition apparatus is composed of a decision controlling circuit (CPU) 28 which is provided with instructions by a major controller or an operation panel, a binary-coded controlling circuit 29 for controlling the conversion of the input images into binary values, a window frame controlling circuit 30 for setting as a window frame a two-dimensional range to be processed with respect to the input images, a partial template cutting circuit 31 for successively cutting partial two dimensional patterns as a template from the binary-coded images within the window frame, a target template memory circuit 32 for previously storing as a target template the patterns to be recognized, a template comparing circuit 33 for comparing the cut partial template with the target template stored previously, and a representative position detecting circuit 34 for detecting the representative position of the template when the template has been determined to be a partial template which most coincides with the target template according to the template comparing circuit 33. The recognized result is fed into a main controller.

The operation of the pattern position recognition apparatus constructed as described hereinabove will be described below.

As shown in the flow chart of FIG. 5, an object 22 having patterns to be recognized is placed on a positional table 21 or the like. The focusing of the television camera 24 is set, and one picture is inputted (step 21). The images inputted are converted to binary (step 22). The two-dimensional range to be processed is set as the window frame (step 23). The partial template is cut from within the two dimension pattern of the window frame (step 24). The exclusive OR of each picture element (bit) with respect to the target template stored previously is obtained for determining a coincidence therebetween (step 25). Step 24 and step 25 are performed with respect to the entire window frame interior. The position at the recognized point is detected as the representative position of the partial template, wherein the total of the exclusive OR is largest, being recognized (step 26). However, the control returns to step 21 when an error recognition is provided. The image inputs are effected to change the binary level and the subsequent control steps are effected again (step 27).

In the conventional construction as described hereinabove, the images are converted to binary so as to compare the coincidence thereof with the total sum of the exclusive OR of the bits of each image element of the partial template and the target template. The recognition accuracy is reduced if the binary code is operated at the same level, when the concentration of the input images has changed due to the illumination changes during the inputting of the images, due to the television camera sensitivity changes and so on. Therefore, the processing becomes complicated in that in the binary level control a change of the binary-coded level is effected. In addition, there is a problem in that the processing time is increased.

SUMMARY OF THE INVENTION

Accordingly, a first object of the present invention is to provide a pattern position recognition apparatus which is capable of recognizing the positions of patterns using variable density images, which do not require binary level control, without a reduction in the recognition accuracy even if the concentration of the input images varies due to illumination changes and/or television camera sensitivity changes.

Another object of the present invention is to provide a pattern position recognizing apparatus in which a determination of the proportional relationship of the concentration levels may be carried out at a high speed.

Still another object of the present invention is to provide a pattern position recognition apparatus in which a proportional coefficient is computed of the concentration of the mask having the patterns to be recognized and the concentration of the input images.

A further object of the present invention is to provide a pattern position recognition apparatus in which the recognition processing is carried out at a high speed.

A still further object is to provide a pattern position recognition apparatus in which a saturation of the concentration of the input images is inspected, and the sensitivity and so on of the television camera are adjusted so as to stabilize the recognition accuracy.

In accomplishing these and other objects, according to one preferred embodiment of the present invention, there is provided a proportional evaluation mapping converting unit for receiving input image signals constituting an x - y - f-geometric space (f being the concentration along the x - y input image plane), for scanning the mask g uv (g is the concentration along the u - v plane of the mask) of a proper size which includes the pattern to recognized with respect to f ij, for computing a proportional coefficient between the values f ij and the g uv for each of the corresponding picture elements, for computing a proportional evaluation index $\sigma$ ij which evaluates the dispersion of the set of proportional coefficients $\{a\ uv | u = 1, 2 \ldots, m, v = 1, 2 \ldots, n\}$ (m, n means the mask size of m X n) for each of the respective partial templates, and for mapping the proportional evaluation index $\sigma$ ij in the x - y input image plane, and a minimum point plural candidate detecting unit for detecting the minimum point on the curved surface constituted from the image data mapped from the x - y - f space into the x - y - σ space by the mapping conversion.

According to another aspect of the present invention, the sum of squares method is used in the evaluation of the dispersion and the computing of the proportional evaluation index σ ij.

According to another aspect of the present invention, the inverse concentration number of the value of each picture element of the mask g uv is stored previously as an inverse mask g'uv (g'uv=1/g uv) for computing the proportional coefficient.

According to another aspect of the present invention, the value σ ij is successively inspected within the x - y - σ geometric space. When the value σ ij becomes a certain value, the partial template to be recognized is determined as being detected and subsequent processing is discontinued.

According to the another aspect of the present invention, the saturation of the concentration in the input images is detected and the illumination and the television camera sensitivity are adjusted when the concentration is saturated.

According to the present invention, the pattern to be recognized is represented as a mask. The mask is scanned with respect to the input images having the patterns to be recognized so as to effect the mapping conversion denoting the proportional relationship of the concentration. Since the patterns are recognized by inspection of this proportional relationship, it becomes possible to recognize the patterns without the control of the binary level even if the concentration of the input images is varied due to changes in illumination and changes in television camera sensitivity, and so on.

According to the present invention, since the sum of squares method is used in the proportional evaluation index σ ij for effecting the inspection of the proportion relationship of the concentration, it becomes possible to increase the speed of the inspection processing.

According to the present invention, since the inverse mask concentration number g'uv (g'uv=1/g) of the mask g uv including the patterns to be recognized is previously computed and stored, and since the inverse mask g'uv is used for the computation of the proportional coefficient, it becomes possible to increase the speed of the proportional coefficient computation.

According to the present invention, in the conversion using the proportional evaluation mapping, the partial template to be recognized is detected when the value σ ij becomes a certain value through the successive inspection of the value σ ij, and the subsequent processing is discontinued, thus making it possible to increase the speed of the recognition processing.

According to the present invention, the saturation of the concentration of the input image is inspected. If the concentration is saturated, the illumination intensity and the television camera sensitivity are adjusted to remove the saturated images. Thus, the information reduction due to the saturation images is prevented so as to increase the recognition accuracy.

BRIEF DESCRIPTION OF THE DRAWINGS

These and other objects and features of the present invention will become apparent from the following description taken in conjunction with the preferred embodiment thereof with reference to the accompanying drawings, in which;

FIG. 3($b$) is an illustration explaining the scanning of the mask g'uv with respect to the image data within the window frame;

FIG. 3($c$) is an illustration for explaining the mapping conversion of the present invention;

FIG. 5 is an operational flow chart of the apparatus shown in FIG. 4.

DETAILED DESCRIPTION OF THE INVENTION

Figure 1:
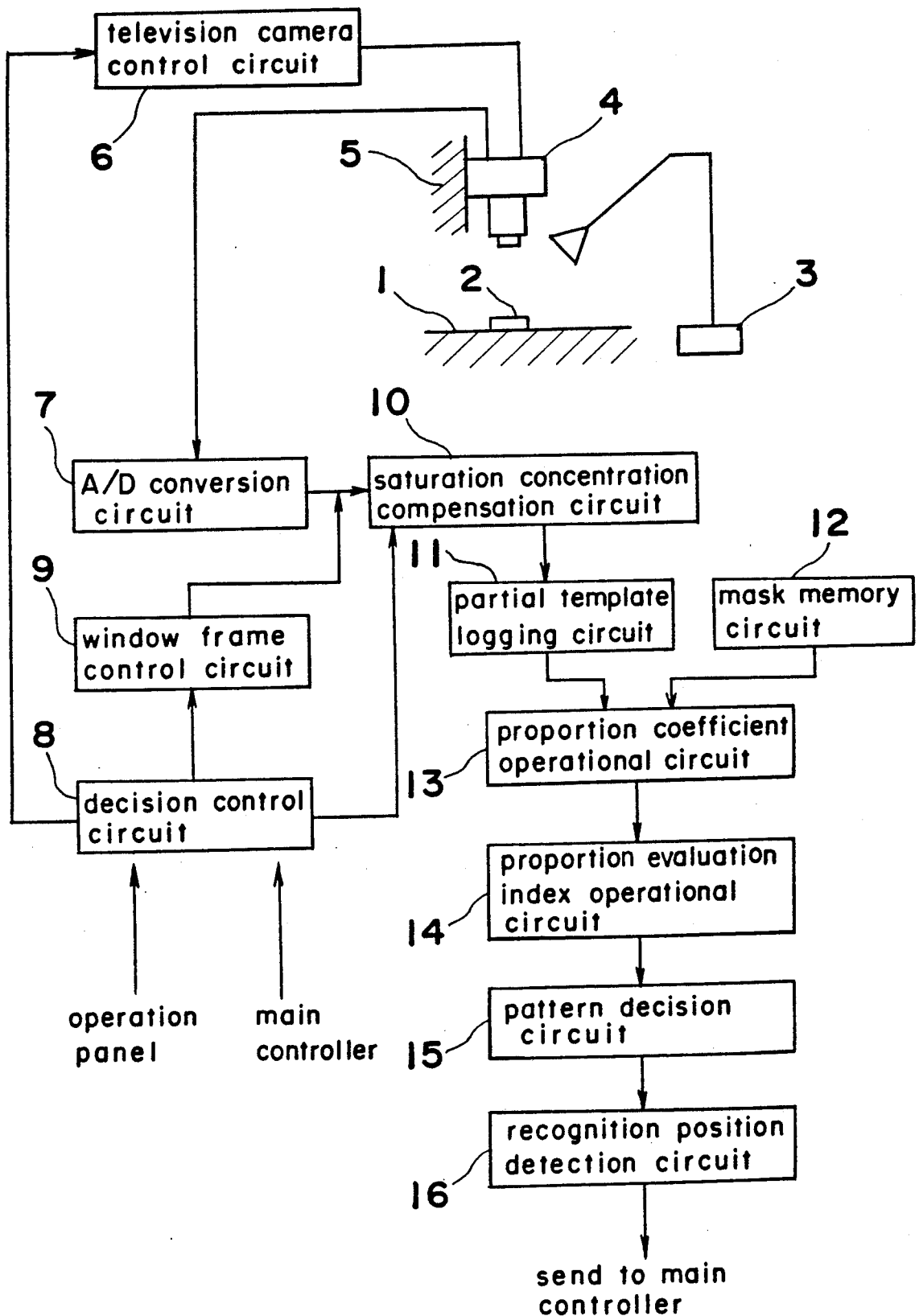
FIG. 1 is a block diagram of a pattern position recognition apparatus in one embodiment of the present invention.

It is noted that like parts are designated by like reference numerals throughout the accompanying drawings.

Figure 2:
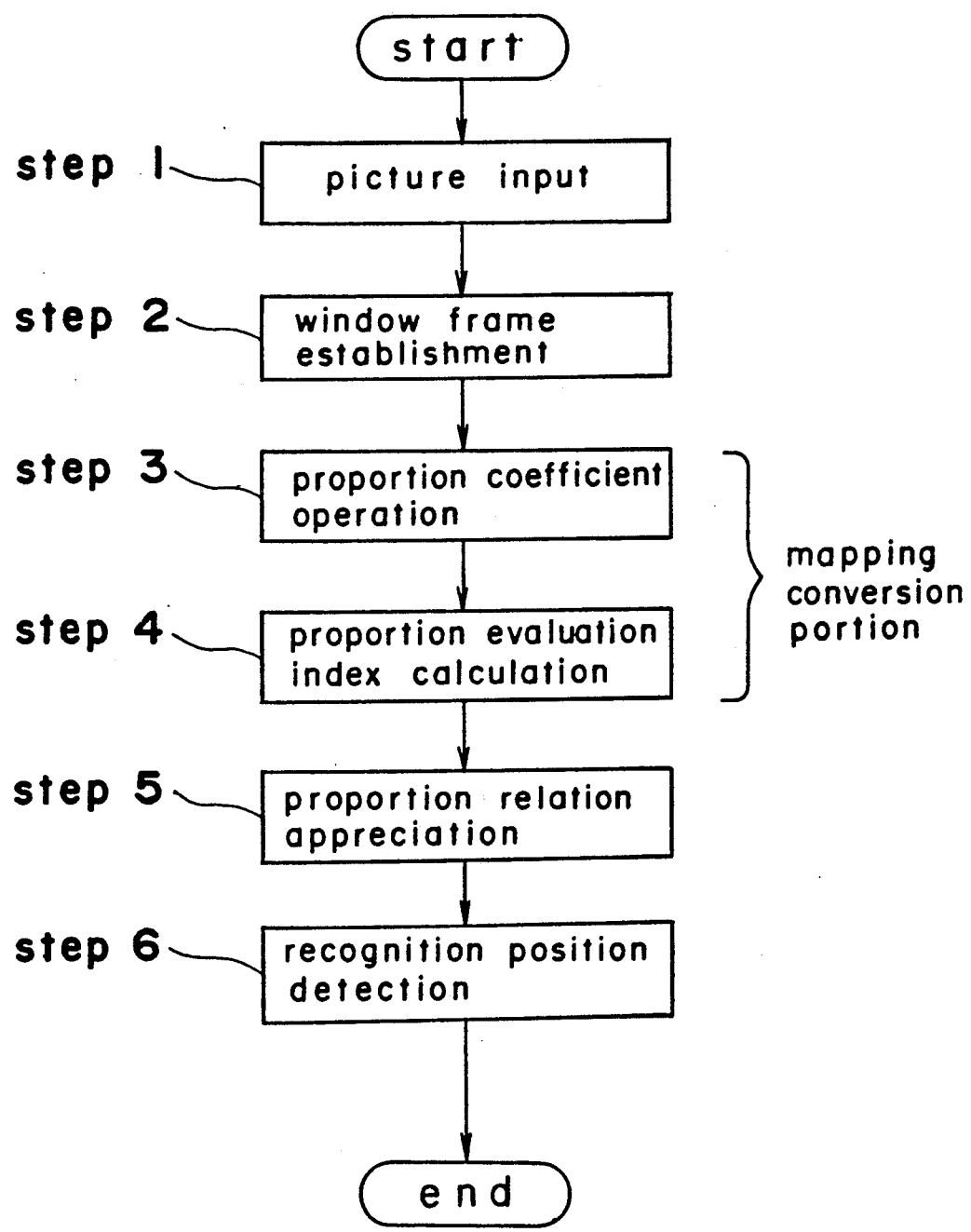
FIG. 2 is an operational flow chart of the pattern position recognition apparatus shown in FIG. 1.

Referring now to the drawings, there is shown in FIG. 1 through FIG. 3 one embodiment of the present invention. FIG. 1 shows a configuration of a pattern position recognition apparatus of the present invention, wherein an illuminating apparatus 3 is disposed to illuminate an object 2 placed on a positional table 1, and a television camera 4 is provided on a movable television camera support portion 5. The television camera 4 is controlled by a television camera controlling circuit 6.

The image signals output from the television camera 4 enter the A/D converting circuit 7 and are numerically encoded into the image data, such as into 0 through 255 gradation levels, and the thus obtained image data are inputted into a microcomputer composed of a CPU, a ROM, a RAM, input/output ports and so on.

The pattern position recognizing apparatus includes a decision controlling circuit (CPU) 8 receiving instructions from a main controller or an operation panel, a window frame controlling circuit 9 for setting as a window frame a two-dimensional range to be processed with respect to the input image data, a saturation concentration compensating circuit 10 for determining whether or not the images within the window frame are saturated and for correspondingly adjusting the illumination level and the television camera sensitivity, a partial template cutting circuit 11 for forming a template by successively cutting partial two dimensional patterns of the images within the window frame, a mask memorizing circuit 12 (processed mask may be used) for storing the patterns to be recognized as light shade pictures of a proper size (for example, 16×16 picture elements), for calculating an inverse of the concentration number of each picture element in advance as an inverse mask and for storing the thus calculated inverse mask, a proportional coefficient computing circuit 13 for scanning the inverse mask with respect to the image data within the window frame, and for calculating the product of the concentration of the respective picture elements of the partial template and the inverse mask concentration to obtain proportional coefficients of concentration, a proportional evaluation index computing circuit 14 for evaluating the dispersion of the proportional coefficients according to a sum of squares method for each partial template so as to evaluate the proportional relationship between the concentration of the partial template and the concentration of the mask, a pattern circuit 15 for determining whether a partial template is recognized based on the proportional evaluation index with respect to each partial template within the window frame, a recognition position detecting circuit 16 for detecting the position represented by any recognized partial templates. The result of the position recognition is fed into the main controller.

The operation will be described hereinafter of the pattern position recognition apparatus constructed as described hereinabove.

As shown in the flow chart of FIG. 2, an object 2 having patterns to be recognized is placed on a positioning table 1 and the focusing degree of the television camera 4 is set to input one picture (step 1). The range to be processed with respect to the input images is set by the window frame control circuit 9 as the window frame (step 2).

Figure 3A:
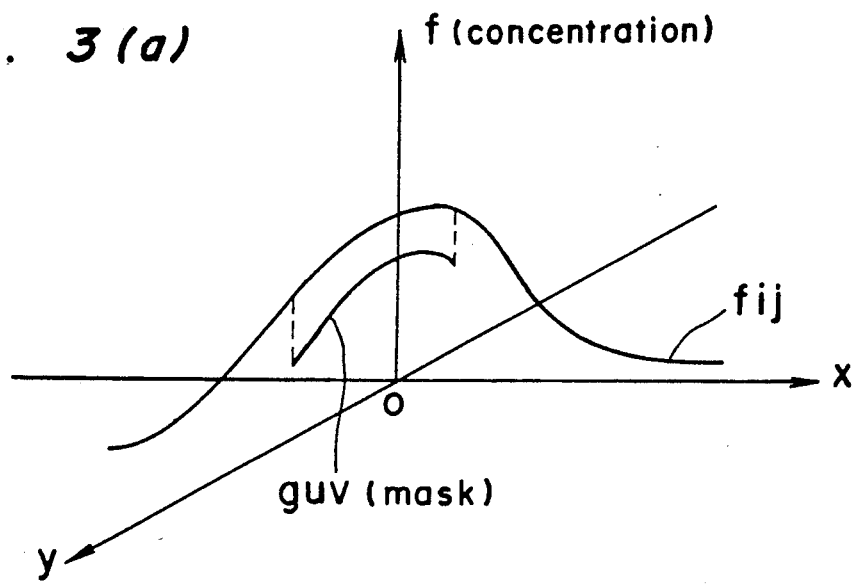
FIG. 3($a$) is a graph illustrating the x - y - f concentration distribution of input image data.
Figure 3B:
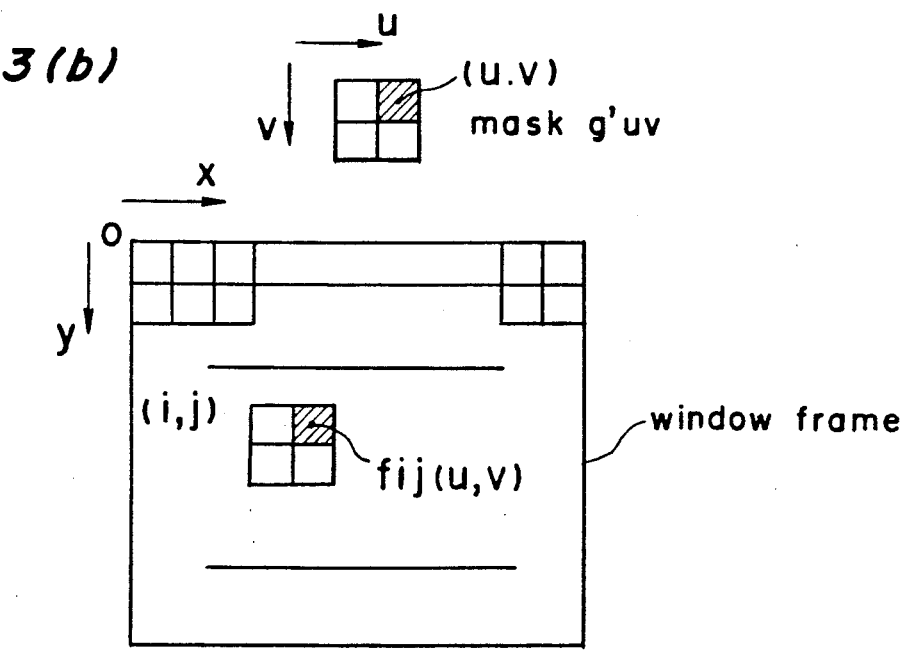
Figure 3C:
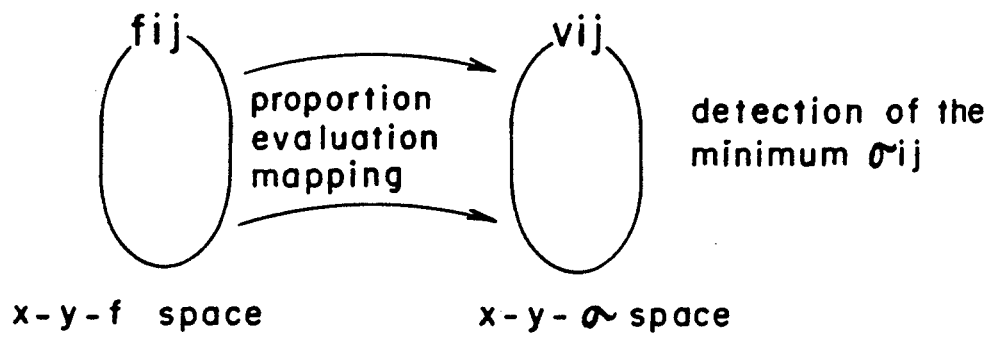
Figure 4:
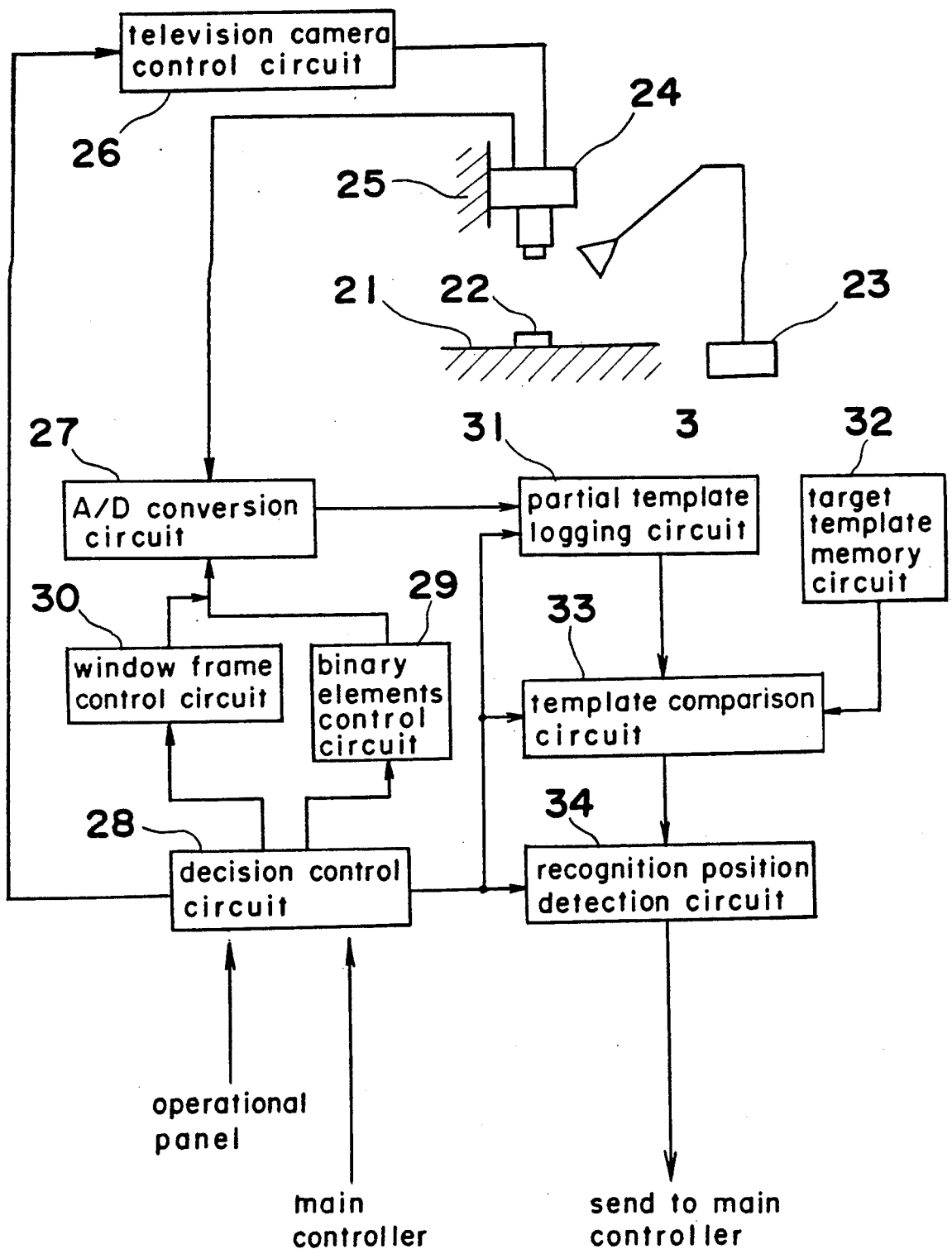
FIG. 4 is a block diagram of a conventional pattern position recognition apparatus.

As shown in FIG. 3(a), the x - y - f geometric space denotes the images within the window frame in which f denotes the concentration of the input images along the x - y window frame plane. A mask g uv, in which g denotes the the concentration of the mask images along a u - v plane of the mask, of a proper size including the pattern to be recognized is made specifying a concentration for each of the picture elements (i, j) of the pattern to be recognized. Since the concentration f ij of an image pattern which coincides with the mask g uv would be proportional to the concentration of the mask g uv, an inverse concentration number of of each picture element of g uv is previously calculated. That is, an inverse mask g'uv (g'uv = 1/g uv, or a value partially processed thereof) is determined and stored in the memory mask circuit 12. As shown in FIG. 3(b), the inverse mask g'uv is scanned with respect to the input image f ij and the product of the partial template f ij (u, v) of the image within the window frame and the inverse mask g'uv is computed (u, v are the positions within the template). That is, a proportional coefficient denoting the ratio between the picture image data f ij (u, v) and the mask g uv is computed for each corresponding picture element (step 3). The dispersion σ uv {u = 1, 2 ..., m, v = 1, 2 ... n, m, n denoting a mask size m × n} of the product is calculated as a proportional evaluation index for each partial template. That is, the sum of squares method (standard deviation, etc. may instead by used) of the product for each template is computed to obtain the proportional evaluation index σ ij, for the evaluation of the proportional relationship for each partial template between the concentration f ij (u, v) and the concentration g uv (step 4). As shown in FIG. 3(c), points corresponding to the x - y - f geometric space are mapped (hereinabove the proportional evaluation index computing unit 14) into a x - y - σ ij geometric space composed of coordinates x, y and the proportional evaluation index values σ ij. The minimum value on the curved surface of the x - y - σ geometric space is detected whereby the values σ ij are arranged according to magnitude in the process of scanning the mask g'uv and stored as σ ij i, j. The value of proportional evaluation index σ ij is observed. The partial template which has, as the representative position (i, j), what is considered the smallest proportional evaluation index σ ij at a time when the processing of the window frame have been completed is determined as being the partial template to be recognized (step 5). (The pattern detecting circuit 15). The position representing the partial template to be recognized is determined as being at the upper left, for example, of the pattern (step 6). In the rearrangement of the values σ ij, if the value of σ ij which is considered the smallest during scanning of the mask g'uv becomes σ ij ≦ ε (ε is a numeral close to 0), the processing may be discontinued. Also, if the concentration is the same in value as the saturation concentration at the concentration of the input image data, the illumination, camera sensitivity and so on are adjusted to remove the saturation image (saturation concentration compensating circuit 10). (It is to be noted that the same can be carried out even in the case of dark images). Also, when the value σ ij calculated as the candidate point is σ ij > A (A denoting a limit value in which the mask is considered to the match partial template), it is determined that the pattern to be recognized does not exist within the partial template.

As is clear from the foregoing description, according to the one aspect of the present invention, the pattern to be recognized is represented as a mask, scanning is effected with respect to the input images having the pattern to be recognized, the mapping conversion considering the proportional relationship of the relative concentrations is effected, and the pattern is recognized by inspection of this proportional relationship. Since the variation ratio remains the same if the concentration of the input image is changed evenly according to the changes in illumination, the changes in television camera sensitivity, and so on, the image processing is effected without the binary level control, and pattern recognition may be carried out at a high speed and with a high accuracy.

According to another aspect of the present invention, the sum of squares method is used in obtaining the proportional evaluation index σ ij for inspecting the proportional relationship of the concentration, whereby the inspection processing may be carried out at a higher speed.

According to another aspect of the present invention, the inverse concentration mask g'uv (g'uv = 1'g) of the mask g uv of the pattern to be recognized is computed and stored in advance, and the inverse mask g'uv is used in the computation of the proportional coefficient, whereby a division operation is thus eliminated, thus increasing the computation speed.

According to another aspect of the present invention, upon conversion of the proportional evaluation mapping, it is judged that the partial template to be recognized has been detected when the value σ ij becomes a certain value through successive inspection of the value σ ij. As the subsequent processing is effected, the mask is scanned with respect to all the images within the window frame to obtain the proportional relationship with respect to the mask of each template, whereby a higher speed of recognition processing may be effected as compared with the inspection of σ ij.

According to another aspect of the present invention, the saturation of the concentration in the input image is inspected, the illumination and the television camera sensitivity are adjusted to remove the saturation images, so that the image data that cannot be relied on in the input information due to the saturation images is not included, thus providing for more stable recognition.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A pattern recognition apparatus for detecting a coincidence between an input image pattern and a target pattern, said apparatus comprising:

means for receiving input image data $f_{ij}$, wherein $f_{ij}$ denotes a concentration of the input image pattern at a picture element i,j on a two-dimensional plane of the input image pattern;

means for storing mask data $g_{uv}$, wherein $g_{uv}$ denotes a concentration of the target pattern at a point u,v on a two-dimensional plane of the target pattern;

means for scanning the mask data $g_{uv}$ with respect to the input image data $f_{ij}$ and for computing a proportional coefficient corresponding to each picture element i,j on the two-dimensional plane of the input image pattern, wherein the proportional coefficient denotes a ratio between the concentration of the input image data $f_{ij}$ and the concentration of the mask data $g_{uv}$;

means for dividing the input image data $f_{ij}$ into a plurality of partial templates each denoting a two-dimensional subsection of the input image pattern;

means for calculating for each partial template a proportional evaluation index $\sigma_{ij}$ corresponding to each picture element i,j of the two-dimensional plane of the input image pattern, the proportional evaluation index $\sigma_{ij}$ denoting a degree of dispersion of the proportional coefficients within each partial template; and, means for detecting, as a candidate partial template, a partial template having a proportional evaluation index $\sigma_{ij}$ of a minimum value.

2. An apparatus as recited in claim 1, further comprising means for calculating the proportional evaluation index $\sigma_{ij}$ by applying the sum of squares method to the proportional coefficients for each partial template.

3. An apparatus as recited in claim 1, further comprising means for calculating and storing inverse mask data $g'_{uv}$, wherein $g'_{uv}=1/g_{uv}$, and means for obtaining the product of the input image data $f_{ij}$ and the inverse mask data $g'_{uv}$ to obtain the proportional coefficients.

4. An apparatus as recited in claim 1, further comprising means for successively inspecting the value of each proportional evaluation index $\sigma_{ij}$ and for determining that a corresponding partial template coincides with the mask data when the value of a proportional evaluation index $\sigma_{ij}$ is less than a specified value.

5. An apparatus as recited in claim 1, further comprising means for detecting a saturation of the concentration of the input image data $f_{ij}$, and for correspondingly adjusting at least one of an illumination level, a camera sensitivity, and a camera focusing of an image input device.

* * * * *